United States Patent
Jain et al.

(10) Patent No.: US 9,584,546 B2
(45) Date of Patent: *Feb. 28, 2017

(54) PROVIDING SERVICES TO VIRTUAL OVERLAY NETWORK TRAFFIC

(71) Applicant: International Business Machines Corporation, Armonk, NY (US)

(72) Inventors: Vinit Jain, Austin, TX (US); Dayavanti G. Kamath, Santa Clara, CA (US); Jayakrishna Kidambi, San Jose, CA (US); Abhijit P. Kumbhare, San Jose, CA (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,377

(22) Filed: Sep. 16, 2015

(65) Prior Publication Data

US 2016/0006769 A1    Jan. 7, 2016

Related U.S. Application Data

(63) Continuation of application No. 13/633,043, filed on Oct. 1, 2012, now Pat. No. 9,178,715.

(51) Int. Cl.
*H04L 29/06* (2006.01)
*H04L 12/46* (2006.01)
(Continued)

(52) U.S. Cl.
CPC .......... *H04L 63/20* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS

| 8,095,786 B1 | 1/2012 | Kshirsagar et al. |
| 8,799,444 B2 * | 8/2014 | Wakumoto ............. H04L 45/02 370/254 |

(Continued)

FOREIGN PATENT DOCUMENTS

| CN | 1476710 A | 2/2004 |
| CN | 1476711 A | 2/2004 |

(Continued)

OTHER PUBLICATIONS

International Search Report and Written Opinion from PCT Application No. PCT/CN2013/084248, dated Jan. 2, 2014.

(Continued)

*Primary Examiner* — Shin-Hon Chen
(74) *Attorney, Agent, or Firm* — Zilka-Kotab, PC (57) ABSTRACT

In one embodiment, an apparatus includes a processor and logic integrated with and/or executable by the processor. The logic is configured to communicate with a first physical switch, a second physical switch, and an overlay network that connects the first physical switch to the second physical switch. The logic is also configured to receive a request for a communication path through the overlay network for a packet, the request including at least the packet, first information about a source of the packet, the source of the packet being connected to the first physical switch, and second information about a most closely connected physical switch to a destination of the packet. Moreover, the logic is configured to determine the destination of the packet, the destination of the packet being connected to the second (Continued)

physical switch. Also, the logic is configured to determine whether to apply a security policy to the packet.

22 Claims, 7 Drawing Sheets

(51) Int. Cl.
  *G06F 17/00* (2006.01)
  *G06F 9/00* (2006.01)
  *G06F 15/16* (2006.01)
(52) U.S. Cl.
  CPC ........ *H04L 63/0272* (2013.01); *H04L 63/101* (2013.01); *H04L 63/1416* (2013.01)

(56) References Cited

U.S. PATENT DOCUMENTS

| | | | |
|---|---|---|---|
| 9,112,804 | B2 | 8/2015 | DeCusatis et al. |
| 9,178,715 | B2 | 11/2015 | Jain et al. |
| 9,215,067 | B2* | 12/2015 | Glider ................ H04L 9/0894 |
| 2002/0141386 | A1* | 10/2002 | Minert ................ H04M 7/066 370/352 |
| 2003/0131245 | A1 | 7/2003 | Linderman |
| 2003/0162499 | A1 | 8/2003 | Jonsson |
| 2008/0163333 | A1* | 7/2008 | Kasralikar .......... H04L 63/1408 726/1 |
| 2009/0094364 | A1 | 4/2009 | Stevens et al. |
| 2009/0300045 | A1 | 12/2009 | Chaudhry et al. |
| 2010/0000528 | A1 | 1/2010 | Palmer et al. |
| 2010/0235880 | A1 | 9/2010 | Chen et al. |
| 2010/0269171 | A1* | 10/2010 | Raz ...................... G06F 17/00 726/13 |
| 2011/0238820 | A1* | 9/2011 | Matsuoka ............ G06F 9/5077 709/224 |
| 2011/0261825 | A1 | 10/2011 | Ichino |
| 2011/0283278 | A1* | 11/2011 | Murrell ................ G06F 9/5077 718/1 |
| 2011/0299537 | A1 | 12/2011 | Saraiya et al. |
| 2012/0054347 | A1 | 3/2012 | Lee et al. |
| 2012/0137375 | A1 | 5/2012 | Ramachandran et al. |
| 2012/0140637 | A1 | 6/2012 | Dudkowski et al. |
| 2012/0158938 | A1 | 6/2012 | Shimonishi et al. |
| 2012/0185856 | A1 | 7/2012 | Ashihara et al. |
| 2012/0216273 | A1 | 8/2012 | Rolette et al. |
| 2012/0304303 | A1* | 11/2012 | Leithead .............. G06F 9/541 726/26 |
| 2013/0070762 | A1* | 3/2013 | Adams ................ H04L 49/70 370/389 |
| 2013/0223440 | A1* | 8/2013 | DeCusatis .......... H04L 67/1097 370/388 |
| 2014/0096183 | A1 | 4/2014 | Jain et al. |

FOREIGN PATENT DOCUMENTS

| | | |
|---|---|---|
| CN | 102217228 A | 10/2011 |
| CN | 102308534 A | 1/2012 |
| CN | 102473111 A | 5/2012 |
| CN | 102523165 A | 6/2012 |
| CN | 102523166 A | 6/2012 |
| CN | 102546351 A | 7/2012 |
| CN | 102549973 A | 7/2012 |
| CN | 102549977 A | 7/2012 |
| CN | 102576343 A | 7/2012 |
| EP | 193838 A2 | 9/1986 |
| EP | 2485155 A1 | 8/2012 |
| JP | H11205388 A | 7/1999 |
| JP | 2008523856 A | 7/2008 |
| JP | 2008523857 A | 7/2008 |
| JP | 2008523858 A | 7/2008 |
| JP | 4429892 B2 | 3/2010 |
| JP | 2010541426 A | 12/2010 |
| JP | 2011070549 A | 4/2011 |
| JP | 2011081588 A | 4/2011 |
| JP | 2011082799 A | 4/2011 |
| JP | 2011160041 A | 8/2011 |
| JP | 2011160171 A | 8/2011 |
| JP | 2011166692 A | 8/2011 |
| JP | 2011166700 A | 8/2011 |
| JP | 2011166704 A | 8/2011 |
| JP | 2011188433 A | 9/2011 |
| JP | 2012043076 A | 3/2012 |
| WO | 2006066909 A1 | 6/2006 |
| WO | 2011037148 A1 | 3/2011 |

OTHER PUBLICATIONS

United Kingdom Examination Report from UK Application No. GB1506949.5, dated Aug. 18, 2015.
Recto, R., "Open Flow in Enterprise Data Centers: Products, Lessons and Requirements," Open Networking Summit, Apr. 18, 2012, pp. 1-21.
Brunner, M., "Programmable Flow-Based Networking with OpenFlow," ETSI Workshop on Future Internet, Mar. 10-11, 2010, pp. 1-16.
Recio, R., "Distributed Overlay Virtual Ethernet (DOVE) Networks," Ethernet Technology Summit, Feb. 21-23, 2012, pp. 1-27.
Small, C., "RouteFlow: An Open Source Project to Provide Virtualized IP routing in OpenFLow Networks," Winter 2012 Joint Techs, Jan. 25, 2012, pp. 1-21.
"RouteFlow Home", Aug. 29, 2012, pp. 1-2, retrieved from www.openflowhub.org/display/routeflow/RouteFlow+Home.
Nascimento, M. et. al., "Virtual Routers as a Service: The RouteFlow Approach Leveraging Software-Defined Networks," CFI '11, ACM, Jun. 13-15, 2011, pp. 1-4.
"Software Defined Networking: A New Paradigm for Virtual Dynamic, Flexible Networking," IBM Systems and Technology, Thought Leadership White Paper, Feb. 2012, pp. 1-6.
Stabler, G. et. al.; "Elastic IP and Security Groups Implementation Using OpenFlow," VTDC '12, ACM, Jun. 18, 2012, pp. 53-60.
Mann, V. et al.; "Identity: A Data Center Network Fabric to Enable Co-existence of Identical Addresses", COMSNETS 2012, Jan. 3-7, 2012, pp. 1-10.
Agrawal, S. et al., "A Framework to Extend Network Infrastructure Services to Virtual Data Centers Using the Network as a Platform," IPCOM000214664D, Cisco Systems, Inc., Feb. 1, 2012, pp. 1-4.
Jain et. al., U.S. Appl. No. 13/633,043, filed Oct. 1, 2012.
Notice of Allowance from U.S. Appl. No. 13/633,043, dated Jun. 15, 2015.
Non-Final Office Action from U.S. Appl. No. 13/633,043, dated Jul. 16, 2014.
Non-Final Office Action from U.S. Appl. No. 13/633,043, dated Mar. 3, 2015.
Advisory Action from U.S. Appl. No. 13/633,043, dated Jan. 22, 2015.
Final Office Action from U.S. Appl. No. 13/633,043, dated Nov. 6, 2014.
Boughzala et al., "OpenFlow Supporting Inter-Domain Virtual Machine Migration," 8th IEEE and IFIP International Conference on Wireless and Optical Communications Networks, May 2011, pp. 1-8.
Mann et al., "CrossRoads: Seamless VM Mobility Across Data Centers through Software Defined Networking," 2012 IEEE/IFIP Network Operations and Management Symposium (NOMS), Apr. 16-20, 2012, pp. 88-96.
Mann et al., "Remedy: Network-Aware Steady State VM Management for Data Centers," Networking 2012. Proceedings 11th International IFIP TC 6 Networking Conference, May 21-25, 2012, pp. 190-204.
Erickson et al., "Optimizing a Virtualized Data Center," SIGCOMM '11, Aug. 15-19, 2011, pp. 478-479.
Fernandes et al., "Virtual networks: isolation, performance, and trends," Ann. Telecommun. vol. 66, Oct. 7, 2010, pp. 339-355.
Hao et al., "Enhancing Dynamic Cloud-based Services; using Network Virtualization," ACM SIGCOMM Computer Communication Review, vol. 40, No. 1, Jan. 2010, pp. 67-74.

(56) References Cited

OTHER PUBLICATIONS

Luo et al., "Accelerated Virtual Switching with Programmable NICs for Scalable Data Center Networking," VISA 2010, Sep. 3, 2010, pp. 65-72.

Anonymous, "A system and method to reduce network power and equipment costs in cloud based; datacenters," IP.com, IPCOM000207905D, Jun. 16, 2011, pp. 1-4.

* cited by examiner

PROVIDING SERVICES TO VIRTUAL OVERLAY NETWORK TRAFFIC

BACKGROUND

The present invention relates to data center infrastructure, and more particularly, this invention relates to providing deep packet inspection services to virtual overlay network traffic in a data center.

Virtual Overlay Networks, such as virtual extensible local area network (VXLAN), distributed overlay virtualization Ethernet (DOVE), and others, use protocol headers that are encapsulated in packets on top of the original network packet to create location transparency. Due to the additional encapsulation protocol headers, it is not possible for existing or legacy Inter-Networking Elements (INEs), such as physical infrastructure routers and switches, among others, to determine information from within the original packet. This is because the original packet inside of the overlay protocol headers is encapsulated as a traditional data payload to the legacy INEs. Furthermore, this lack of visibility of the original packet prevents INEs from implementing sophisticated network security and services.

Protocols like VXLAN use User Datagram Protocol/Internet Protocol (UDP/IP) to encapsulate the original Ethernet packet for transmission over physical networks. The original Ethernet packets are tunneled through the network from an originator to a nearest VXLAN gateway. VXLAN gateways connect virtual networks to non-virtual networks (legacy networks having physical components). Since VXLAN gateways understand (are capable of processing) VXLAN protocol and tunnels, they have the capability to identify the encapsulated packets.

Furthermore, virtual machines (VMs) in an overlay network, such as a VXLAN or DOVE network, that belong to a common tenant (e.g., a single user of the network resources, such as a company, agency, individual, etc.) may be sorted into groups (such as virtual networks having different virtual network identifiers (VNIDs) in VXLAN, domains having different domain identifiers or DOVE Virtual Groups (DVG) in DOVE) such that security policy rules may be applied governing communications between VMs which belong to different groups. A typical method to apply security policy is to use physical security appliances that are accessible on the network and which have the ability to apply specific security services.

Therefore, in order to apply security services to overlay network traffic, the traffic must be routed to the physical security appliances. However, the intermediate network devices, such as switches, routers, etc., do not have visibility inside of the overlay traffic, and therefore do not understand that some traffic should be routed to the physical security appliances while other traffic should be routed directly to its designated destination address.

Therefore, a method and network architecture which allowed for proper overlay traffic that needs security services applied to be routed to the physical security appliances while directly routing other traffic between the source and destination VMs would be very beneficial.

SUMMARY

In one embodiment, an apparatus includes a processor and logic integrated with and/or executable by the processor. The logic is configured to communicate with a first physical switch, a second physical switch, and an overlay network that connects the first physical switch to the second physical switch. The logic is also configured to receive a request for a communication path through the overlay network for a particular packet, the request including at least the packet, first information about a source of the packet, the source of the packet being connected to the first physical switch, and second information about a most closely connected physical switch to a destination of the packet. Moreover, the logic is configured to determine the destination of the packet, the destination of the packet being connected to the second physical switch. Also, the logic is configured to determine whether to apply a security policy to the packet.

In another embodiment, a computer program product includes a computer readable storage medium having program instructions embodied therewith. The computer readable storage medium is not a transitory signal per se. The embodied program instructions are readable/executable by a processor to cause the processor to communicate, by the processor, with a first physical switch, a second physical switch, and an overlay network that connects the first physical switch to the second physical switch. Also, the embodied program instructions are readable/executable by the processor to cause the processor to receive, by the processor, a request for a communication path through the overlay network for a particular packet, the request including at least the packet, first information about a source of the packet, the source of the packet being connected to the first physical switch, and second information about a most closely connected physical switch to a destination of the packet. Moreover, the embodied program instructions are readable/executable by the processor to cause the processor to determine, by the processor, the destination of the packet, the destination of the packet being connected to the second physical switch. Additionally, the embodied program instructions are readable/executable by the processor to cause the processor to determine, by the processor, whether to apply a security policy to the packet.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a method for applying security policy in an overlay network includes receiving a request for a communication path through an overlay network, the request being sent from a first physical switch in the overlay network, wherein the first physical switch is connected to a source of the packet, and wherein the request includes at least: a packet, first information, and second information; determining a second physical switch which is connected to a destination of the packet, determining whether a security policy is to be applied to the packet based on at least one of: contents of the packet, the first information, and the second information, selecting a communication path between the first physical switch and the second physical switch, wherein the selected communication path directly connects the first physical switch to the second physical switch when it is determined to not apply the security policy to the packet, and wherein the selected communication path connects the first physical switch to the second physical switch via the security appliance when it is determined to apply the security policy to the packet, and sending the selected communication path to the first physical switch.

In another general embodiment, a system includes an overlay network connecting a first physical switch to a second physical switch, a switch controller in communication with the first physical switch and the second physical switch, a security appliance adapted for applying a security policy to packets sent thereto via the overlay network, at least a first server connected to the first physical switch, the first server hosting at least a source virtual machine (VM), at least a second server connected to the second physical switch, the second server hosting at least a destination VM, and a virtual network controller in communication with at least the first physical switch, the second physical switch, and the overlay network, wherein the virtual network controller includes logic adapted for receiving a request for a communication path through the overlay network, the request being sent from the first physical switch and including at least: a packet, first information about the source VM which originated the packet, and second information about a destination of the packet; logic adapted for determining the destination of the packet which is connected to the second physical switch, logic adapted for determining whether a security policy is to be applied to the packet based on at least one of: contents of the packet, the first information, and the second information, logic adapted for selecting a communication path between the first physical switch and the second physical switch, wherein the selected communication path directly connects the first physical switch to the second physical switch when it is determined to not apply the security policy to the packet, and wherein the selected communication path connects the first physical switch to the second physical switch via the security appliance when it is determined to apply the security policy to the packet, and logic adapted for sending the selected communication path to the first physical switch.

In yet another general embodiment, a computer program product for applying security policy in an overlay network includes a computer readable storage medium having computer readable program code embodied therewith, the computer readable program code including computer readable program code configured for receiving a request for a communication path through an overlay network, the request being sent from a first physical switch in the overlay network, wherein the first physical switch is connected to a source of the packet, and wherein the request includes at least: a packet, first information, and second information; computer readable program code configured for determining a second physical switch which is connected to a destination of the packet, computer readable program code configured for determining whether a security policy is to be applied to the packet based on at least one of: contents of the packet, the first information, and the second information, computer readable program code configured for selecting a communication path between the first physical switch and the second physical switch, wherein the selected communication path directly connects the first physical switch to the second physical switch when it is determined to not apply the security policy to the packet, and wherein the selected communication path connects the first physical switch to the second physical switch via the security appliance when it is determined to apply the security policy to the packet, and computer readable program code configured for sending the selected communication path to the first physical switch.

According to yet another general embodiment, a virtual network controller includes logic adapted for receiving a request for a communication path through an overlay network connecting a first physical switch and a second physical switch, the request being sent from the first physical switch and including at least: a packet, first information about a source of the packet, and second information about a destination of the packet; logic adapted for determining the destination of the packet which is connected to the second physical switch, logic adapted for determining whether a security policy is to be applied to the packet based on at least one of: contents of the packet, the first information, and the second information, logic adapted for selecting a communication path between the first physical switch and the second physical switch, wherein the selected communication path directly connects the first physical switch to the second physical switch when it is determined to not apply the security policy to the packet, and wherein the selected communication path connects the first physical switch to the second physical switch via a security appliance when it is determined to apply the security policy to the packet, and logic adapted for sending the selected communication path to the first physical switch, wherein the virtual network controller adheres to distributed overlay virtual Ethernet (DOVE) standards.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
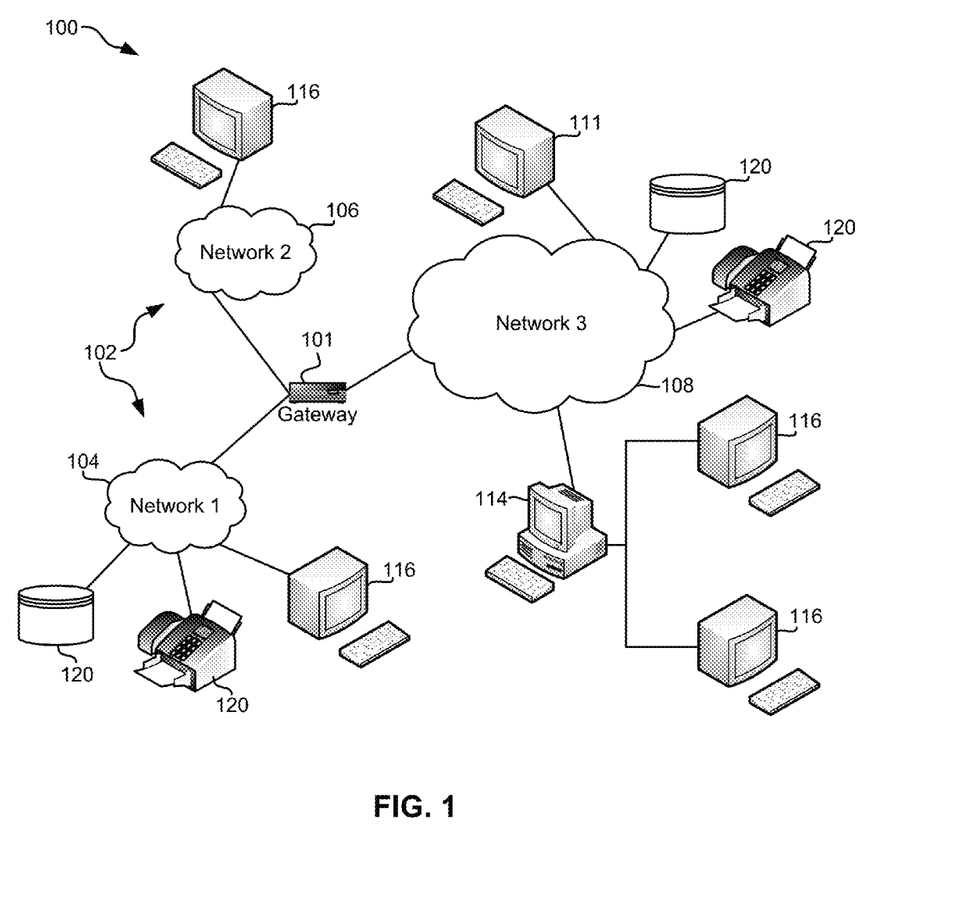
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
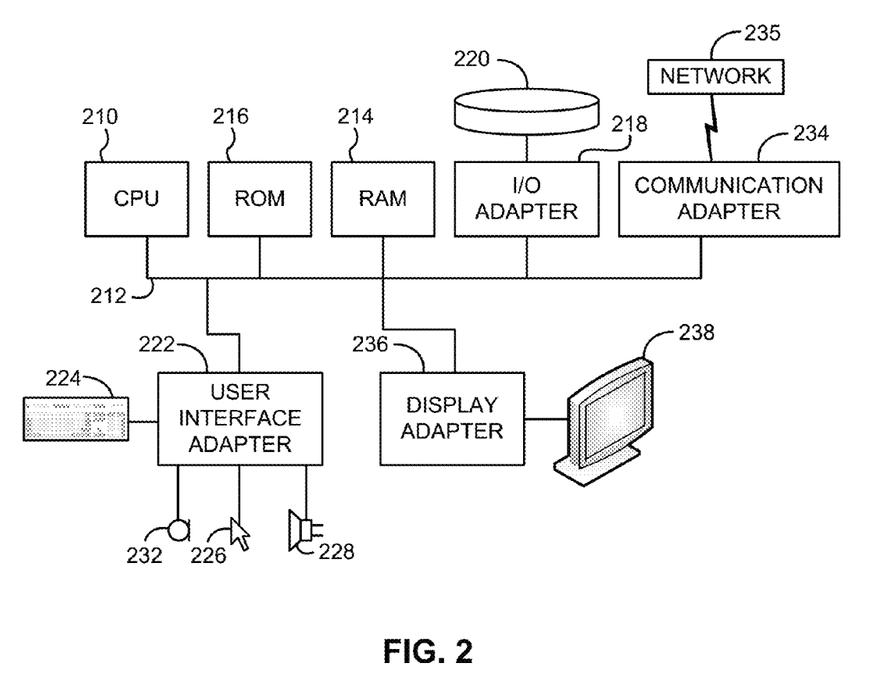
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
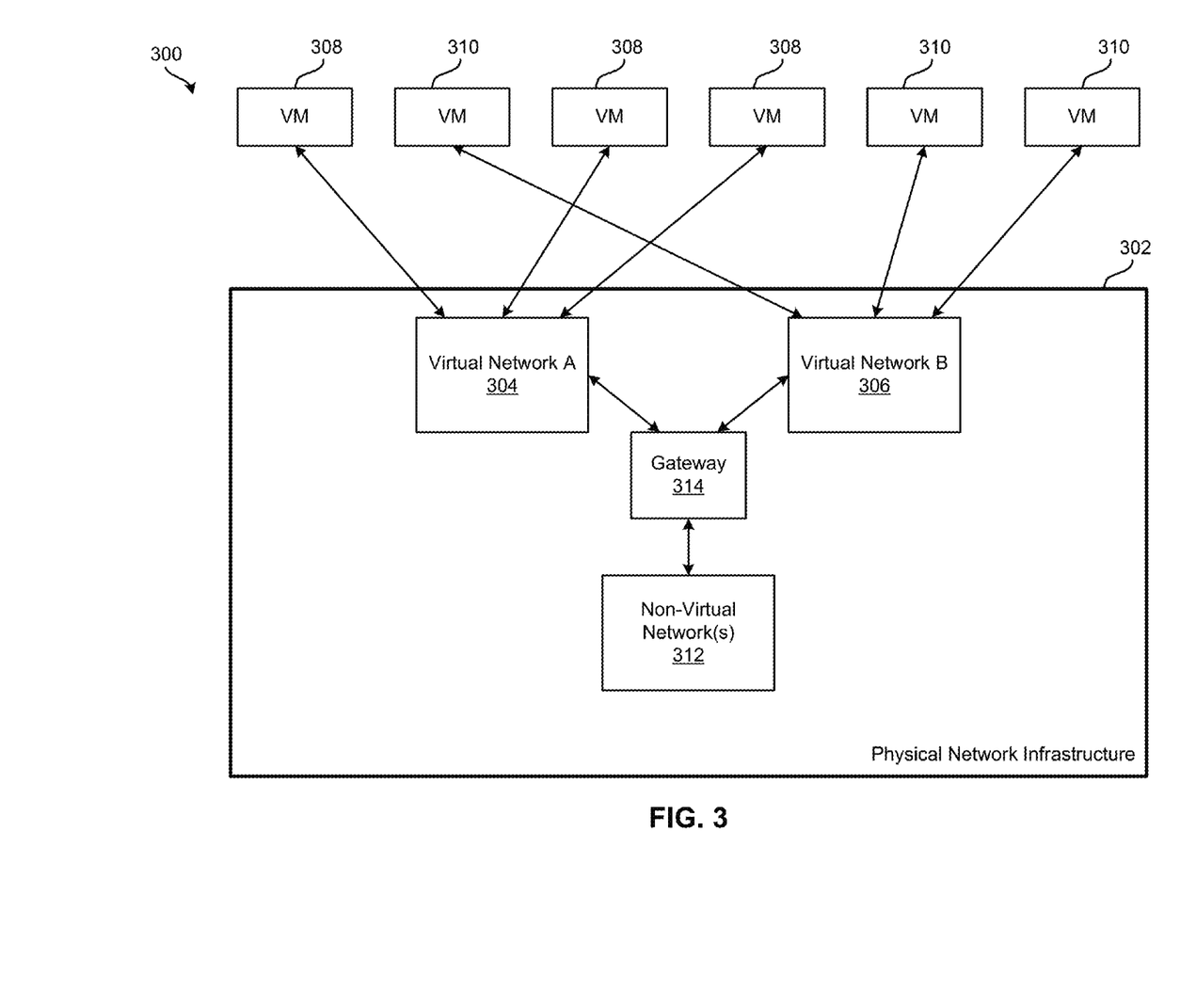
FIG. 3 is a conceptual view of an overlay network, according to one embodiment.

Referring now to FIG. 3, a conceptual view of an overlay network 300 is shown according to one embodiment. The overlay network may utilize any overlay technology, standard, or protocol, such as a Virtual eXtensible Local Area Network (VXLAN), Distributed Overlay Virtual Ethernet (DOVE), Network Virtualization using Generic Routing Encapsulation (NVGRE), etc.

In order to virtualize network services, other than simply providing a fabric communication path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across Layer-3 (L3) domains, between one subnet to another subnet, internet protocol (IP) subnet to IP subnet, etc. But if it the architecture is similar to a large flat switch, in a very large Layer-2 (L2) domain, then the VMs are aided in their attempt to move data across the architecture.

Figure 4:
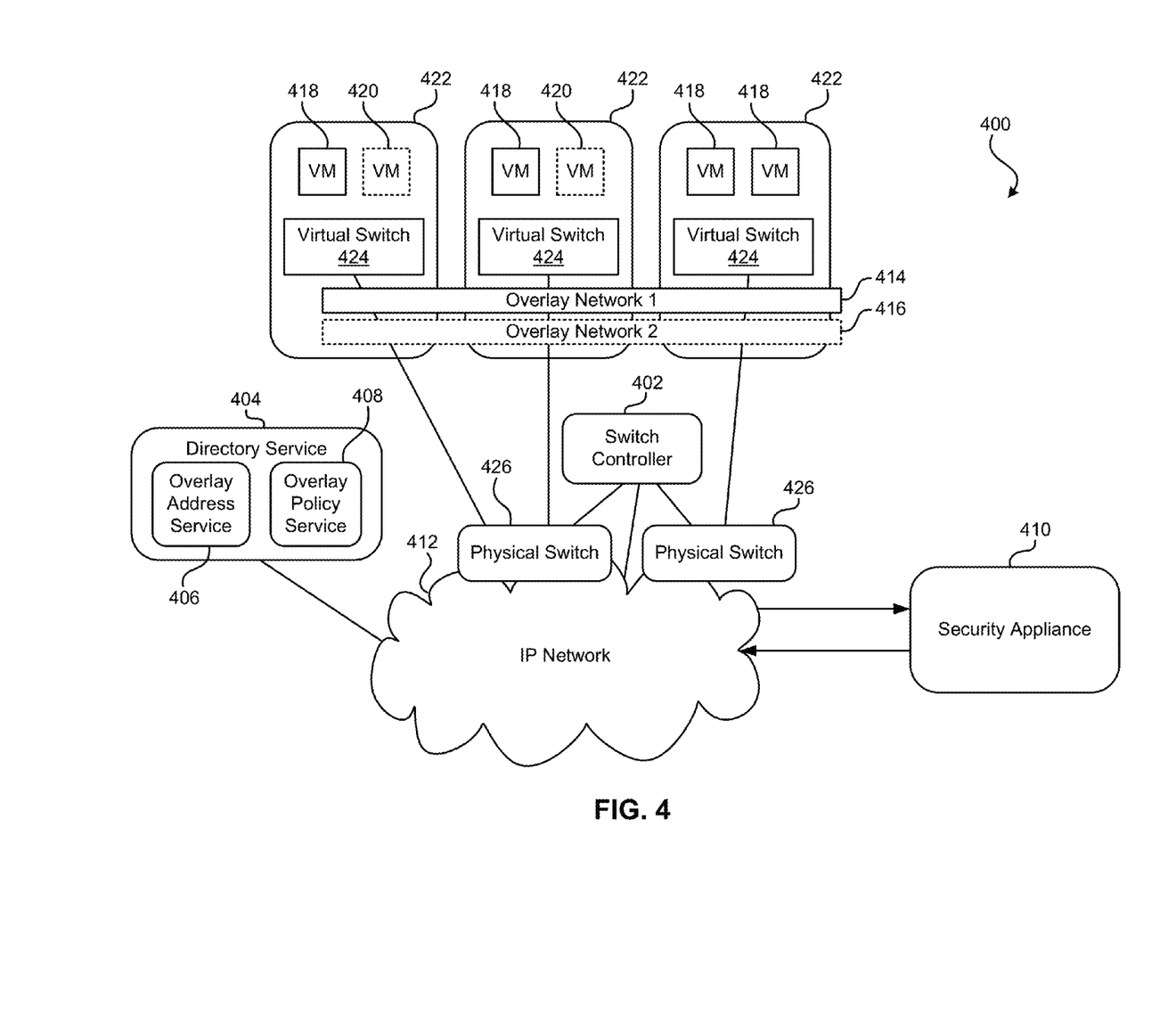
FIG. 4 is a simplified diagram of a system having an overlay network utilizing Distributed Overlay Virtual Ethernet (DOVE), according to one embodiment.

FIG. 4 shows a simplified diagram of a system 400 having an overlay network utilizing DOVE, according to one embodiment. The system 400 comprises a switch controller 402 (such as an OpenFlow controller), an IP network 412 which is capable of communicating with the switch controller 402 (in one example, the IP network 412 is OpenFlow-capable and managed, with the switch controller 402 being an OpenFlow controller), a directory service 404 (which may comprise overlay specific modules—such as a DOVE address service module 406 and/or a DOVE policy service module 408), at least one security appliance 410, a plurality of servers 422, and at least one overlay network—such as Overlay Network 1 414 and/or Overlay Network 2 416.

Each of the servers 422 may comprise a virtual switch 424 (that is capable of communicating with the directory service 404, such as DOVE vSwitches, VXLAN vSwitches, etc., in several examples) and one or more VMs (with VMs on Overlay Network 1 designated 418 and VMs on Overlay Network 2 designated 420). The servers 422 may also utilize a virtualization platform (not shown) from any vendor, such as VMWare ESX, IBM PowerVM, KVM, Microsoft's Hyper-V, Xen, etc.

The IP network 412 may comprise any number of switches, routers, connections, cables, etc., arranged in any conceivable fashion and interconnected with the elements of the system 400 in at least the arrangement shown in FIG. 4, according to one embodiment. Also included on an edge of the IP network 412 and connected to the servers 422 is at least one physical switch 426 capable of communicating with the switch controller 402. For example, when OpenFlow is utilized, the physical switches 426 are OpenFlow-capable. These OpenFlow-capable physical switches 426 are programmable to provide different paths for traffic flows sent or received through the IP network 412. The OpenFlow-capable physical switches 426 are also in communication with the directory service 404, either directly or through the IP network 412 (as shown in FIG. 4).

In another embodiment, any of the physical switches 426 may be capable of providing overlay functionality to packets received and/or sent by each switch.

According to one embodiment, the system 400 may be OpenFlow-managed (via an OpenFlow controller 402) and may work in concert with a DOVE directory service 404 to efficiently direct traffic in a way to ensure optimal application of security policy.

In an OpenFlow managed network, the OpenFlow controller 402 has knowledge of the network node map and the ability to choose a communication path for packets to be forwarded programmatically. When a DOVE VM 418 or 420 begins to communicate with another VM located on a different physical server 422, the DOVE virtual switch 424 on the source physical server 422 will query the DOVE controller 404 to determine the location of the physical server 422 and the security policy (as directed by the DOVE Policy Service module 408) to be applied between the two VMs. Therefore, the DOVE controller 404 is now aware that these two VMs will begin communicating and also knows the security policy to be applied between these two VMs. If the security policy stipulates that the traffic between the two VMs should be routed through a Security Appliance 410, the DOVE directory service 404 may inform the OpenFlow controller 402 to program the network nodes such that the communication path between the two VMs goes through the Security Appliance 410.

The OpenFlow-capable physical switches 426, in some embodiments, may determine a route of a packet through the system 400 based on values of a DOVE header and an inner payload header of each packet. If a packet's inner payload header indicates that the packet should receive security policy application, the OpenFlow-capable switches 426 may request a communication path from the OpenFlow controller 402 which will result in the packet being routed through the security appliance 410; or, in another embodiment, the OpenFlow-capable switches 426 may have this information accessible so that each switch 426 may determine the route without aid of the OpenFlow controller 402 after an initialization procedure. The amount of processing used in this operation may be reduced by designating markers in the DOVE header to identify packets that need security policy application so that the OpenFlow-capable switches 426 do not examine the inner payload header in order to make this determination. Of course, this procedure may also be applied to other overlay technologies, such as VXLAN, NVGRE, etc.

Each of the physical switches 426, the switch controller 402, the servers 422, and the security appliance 410 may comprise at least one processor for executing logic, such as a central processing unit (CPU), a field programmable gate array (FPGA), an integrated circuit (IC), an application specific integrated circuit (ASIC), or some other suitable processor(s) known in the art.

According to one embodiment, access control lists (ACLs) may be applied at the servers or physical switches 426, the switch controller or OpenFlow controller 402, or elsewhere in the system 400 to route incoming overlay-encapsulated packets to the security appliance 410. Upon activation of such an ACL on a port of any device, any packets received on the ACL-activated port will be routed through the security appliance 410. Then, the security appliance 410 may implement a chain of services.

Any services known in the art may be applied to the traffic, such as firewall services, intrusion prevention system (IPS) services, intrusion detection system (IDS), IPS/IDS services, server load balancing services, LAN optimization services, VPN services, video optimization services, network address translation (NAT) services, encryption services, decryption services, etc., among many other possibilities, as would be known to one of skill in the art. Each of these services may be independently activated, independently bypassed, or manually selected, as desired by a system administrator upon initiating the security appliance 410.

For L3 User Datagram Protocol/Internet Protocol (UDP/IP)-encapsulated traffic being sent from an overlay network (such as Overlay Network 1 414, Overlay Network 2 416, etc.) to a non-virtualized legacy network (such as IP network 412) or to another device capable of receiving tunneled traffic, the security appliance 410 may apply services prior to delivering the packet to the destination device by receiving inner packets that have been de-encapsulated from overlay-encapsulated packets.

Figure 5:
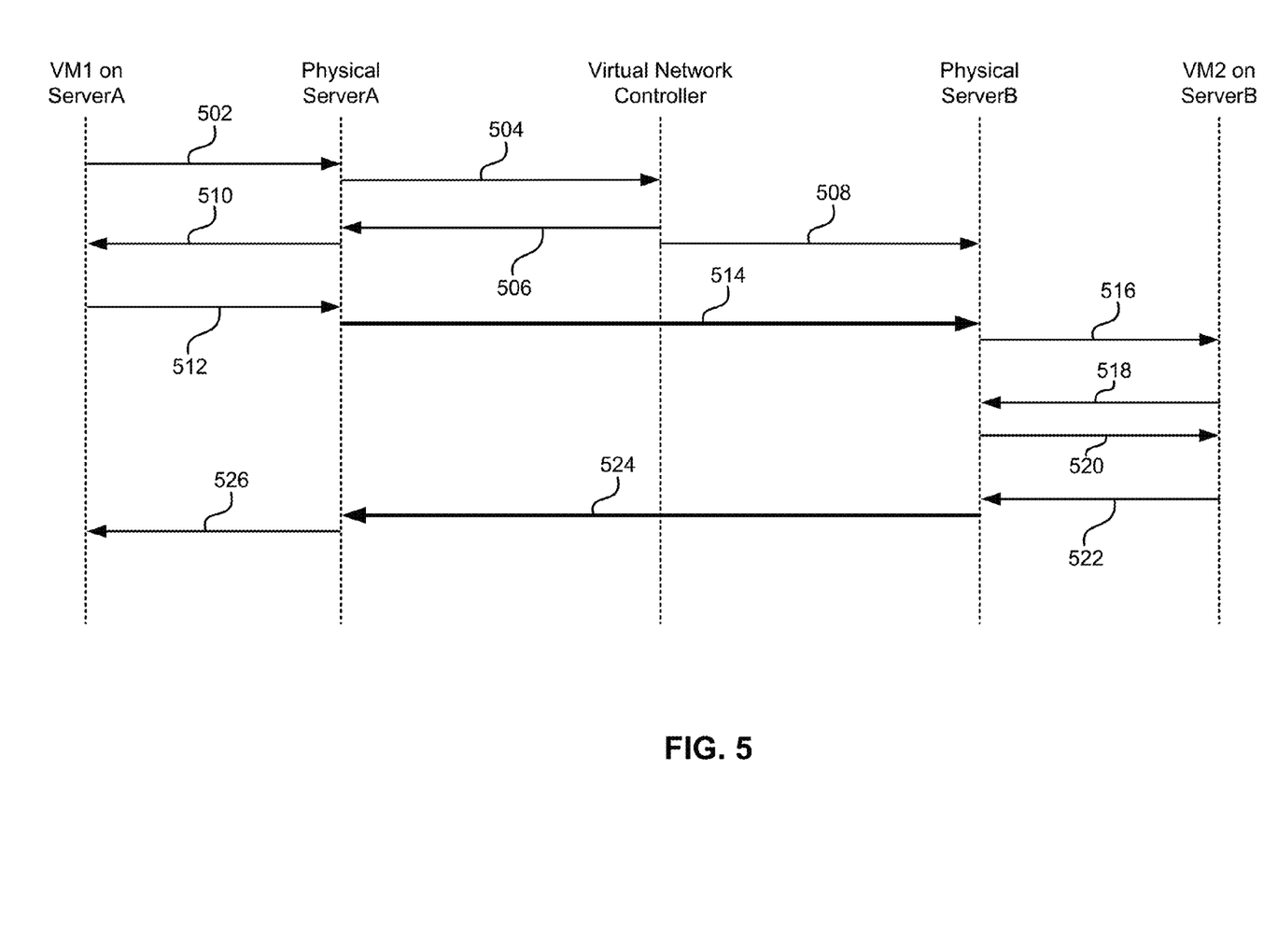
FIG. 5 is a diagram of a connection sequence, according to one embodiment.

Now referring to FIG. 5, a diagram of a connection sequence is shown according to one embodiment. It is assumed that VM1 is a source of a packet and VM2 is a destination of the packet. First, VM1 sends an Address Resolution Protocol (ARP) request 502 to the Physical ServerA hosting VM1. Physical ServerA then sends a request 504 to the virtual network controller (such as a DOVE Policy Server/Directory Service) for the destination address associated with the ARP request. The virtual network controller then responds 506 to Physical ServerA with the address for VM2 on Physical ServerB. Also, the virtual network controller informs 508 Physical ServerB about VM1's presence on Physical ServerA.

Physical ServerA then responds 510 to the ARP request with information about the destination address for the packet. VM1 on ServerA then sends out the packet 512 for delivery to VM2. Physical ServerA provides overlay functionality (encapsulation and tunneling to Physical ServerB) to the packet and sends the encapsulated packet 514 to Physical ServerB. Physical ServerB then provides overlay functionality (tunnel end-point and de-capsulation) to the packet and sends the de-capsulated packet 516 to VM2 on ServerB.

Once this relationship is established, it is easier to send packets across the overlay network from either of VM1 or VM2. For example, if VM2 on ServerB is to send a packet to VM1 on ServerA, an ARP request 518 is sent to physical ServerB, Physical ServerB responds (since it already knows VM1 on ServerA's information) 520 with VM1's information, VM2 on ServerB sends the packet 522, Physical ServerB provides overlay functionality to the packet and delivers 524 the encapsulated packet to Physical ServerA, and Physical ServerA delivers 526 the de-capsulated packet to VM1 on ServerA.

Figure 6:
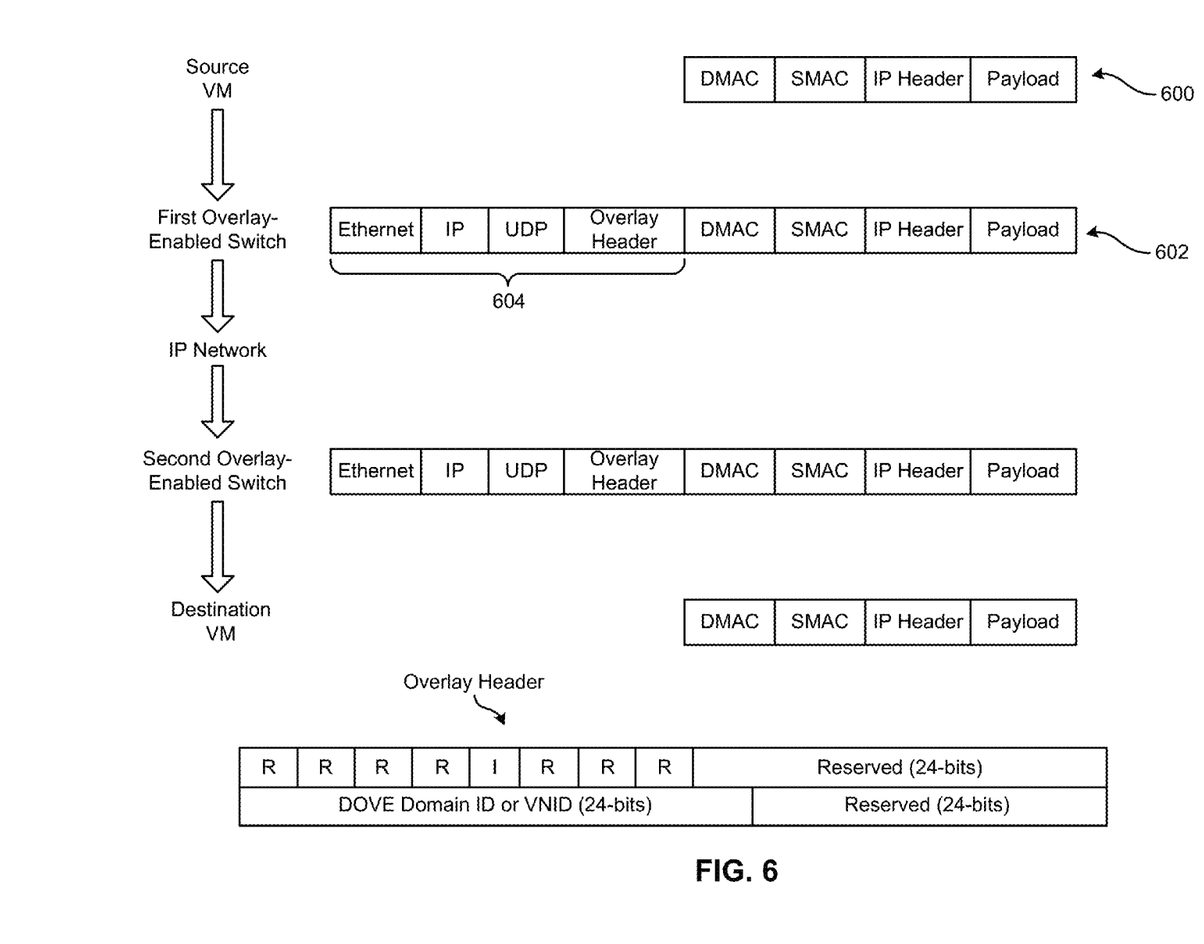
FIG. 6 shows packet headers at different stages of packet forwarding, according to one embodiment.

Now referring to FIG. 6, packet headers at different stages of packet forwarding are shown, according to one embodiment. A packet 600 is shown having a payload, IP header, source media access address (SMAC), and destination MAC (DMAC). This packet may be produced at a source VM or any other device capable of producing packets. Once the packet 600 arrives at a first overlay-enabled (or capable) switch, it is encapsulated with a header 604 to be tunneled to a second overly-enabled switch closest to the destination VM. The tunnel header 604 includes an overlay header, a UDP header, an IP header, and an Ethernet header. This encapsulated packet 602 may then be tunneled through the IP network to arrive at the second overly-enabled switch, where it is de-capsulated, and delivered to the destination VM.

The overlay header is shown in more detail as well, with a virtual network identifier (VNID) or DOVE domain or group ID shown having 24-bits in size, along with other reserved fields, as would be understood by one of skill in the art. What is important to note here is that this header may include a bit or field which may indicate that the packet is to receive application of a security policy, in one embodiment, such that the packet gets routed through a security appliance in the IP network before arriving at the destination VM.

Figure 7:
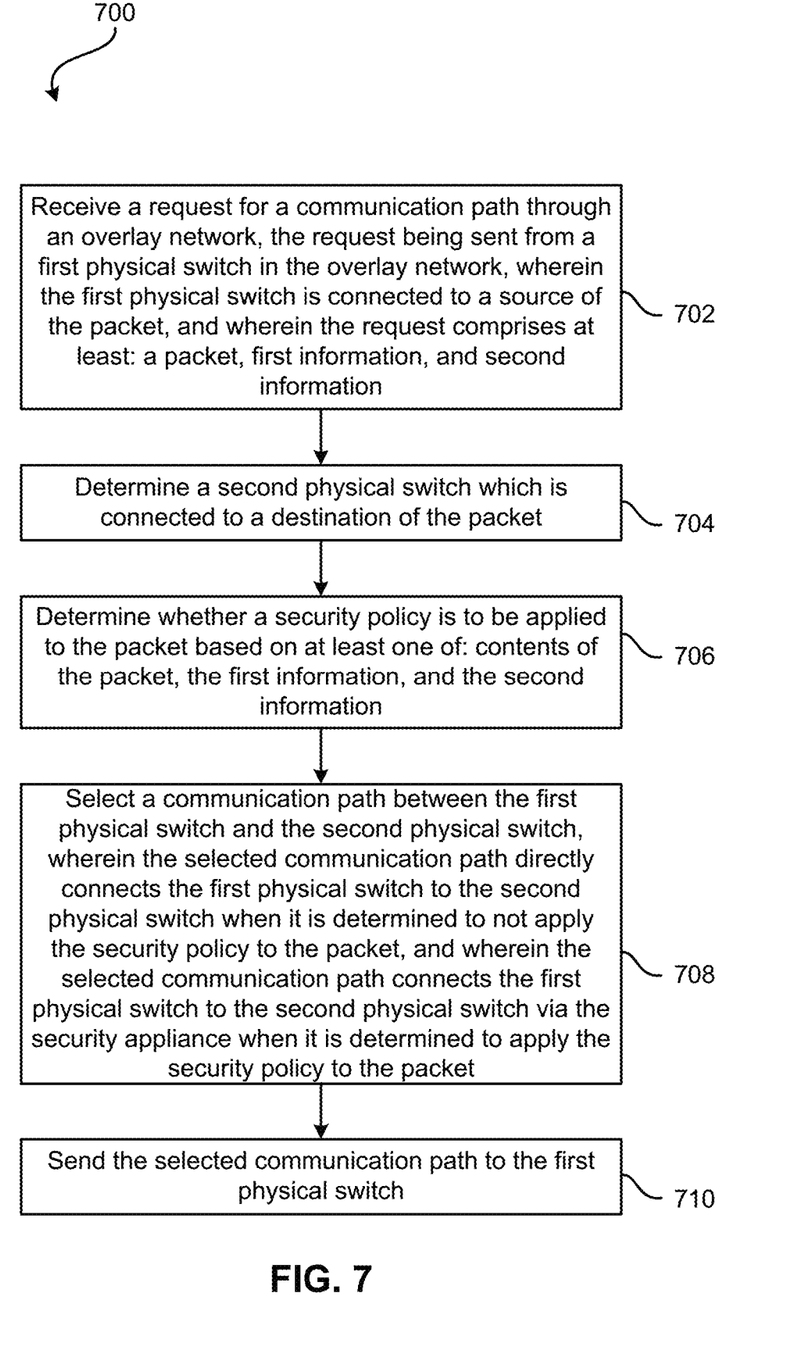
FIG. 7 is a flowchart of a method, according to one embodiment.

Now referring to FIG. 7, a flowchart of a method 700 is shown, according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a switch controller, a virtual network controller such as a DOVE controller, an overlay-capable network device, a processor (such as a CPU, an ASIC, an FPGA, etc.), a gateway, an OpenFlow-capable switch, an OpenFlow controller, or some other suitable device, in various approaches.

As shown in FIG. 7, method 700 may initiate with operation 702, where a request for a communication path through an overlay network is received. The request may be sent from a first physical switch in the overlay network, and the first physical switch may be connected to a source of the packet. In one approach, the request may comprise at least: a packet, first information, and second information. In an alternate approach, the request may include only first and second information, along with some header information from the packet.

In one embodiment, the first information may comprise at least an address of a source VM which originated the packet. In this case, the source of the packet is the source VM. In another embodiment, the second information may comprise at least an address of the second physical switch, but may also include address information for the destination of the packet, which may be connected to the second physical switch.

In operation 704, a second physical switch which is connected to a destination of the packet is determined. In one embodiment, a destination of the packet is determined, and from that information, a second physical switch most closely connected to the destination of the packet may be determined.

In one approach, there may be only one physical switch to which both the source and the destination are connected, e.g., the first and second physical switch are the same switch.

According to one embodiment, the first and second physical switches may be capable of providing overlay functionality to packets received and sent by each switch, e.g., they are overlay-capable switches. Any overlay protocol and/or technology or standards may be used, such as VXLAN, DOVE, NVGRE, etc.

In operation 706, it is determined whether a security policy is to be applied to the packet based on at least one of: contents of the packet (which may include header information such as a payload, an overlay header, an inner packet header, UDP/IP headers, etc.), the first information, and the second information.

In operation 708, a communication path between the first physical switch and the second physical switch is selected. In one approach, the selected communication path directly connects the first physical switch to the second physical switch when it is determined to not apply the security policy to the packet. In another approach, the selected communication path connects the first physical switch to the second physical switch via the security appliance when it is determined to apply the security policy to the packet.

In operation 710, the selected communication path is sent to the first physical switch, such that the first physical switch may implement the selected communication path when sending traffic from the source of the packet to the destination of the packet.

In a further embodiment, a switch controller may be instructed to program overlay network nodes such that any packets transferred between the source of the packet and the destination of the packet proceed along the selected communication path.

In one approach, the first physical switch may be connected to at least a first server hosting at least a source VM which originated the packet and is the source of the packet, the second physical switch may be connected to at least a second server hosting at least a destination VM which is the destination of the packet, and operation 706 where it is determined whether the security policy is to be applied to the packet may further comprise, when it is determined that the source VM and the destination VM are in a common group or domain, determining to not apply the security policy, or when it is determined that the source VM and the destination VM are not in a common group or domain, determining to apply the security policy.

In another approach, operation 706 where it is determined whether the security policy is to be applied to the packet may further comprise applying ACLs to the packet to determine whether the security policy is to be applied to the packet.

According to one approach, the security policy may direct application of one or more services by a security appliance. Any services or security policies may be used, such as: firewall services, IPS, IDS, server load balancing services, VPN services, video optimization services, and/or WAN optimization services, etc.

According to various embodiments, method 700 may be implemented in a system or computer program product, as would be appreciated by one of skill in the art upon reading the present descriptions.

In one such embodiment, a system may comprise an overlay network connecting a first physical switch to a second physical switch, a switch controller in communication with the first physical switch and the second physical switch, a security appliance adapted for applying a security policy to packets sent thereto via the overlay network, at least a first server connected to the first physical switch, the first server hosting at least a source VM, at least a second server connected to the second physical switch, the second server hosting at least a destination VM, and a virtual network controller in communication with at least the first physical switch, the second physical switch, and the overlay network. In one approach, there may be only one physical switch to which both the source (the first server hosting the source VM) and the destination (the second server hosting the destination VM) are connected.

The virtual network controller may comprise: logic adapted for receiving a request for a communication path through the overlay network, the request being sent from the first physical switch and comprising at least: a packet, first information about the source VM which originated the packet, and second information about a destination of the packet. The virtual network controller may further comprise logic adapted for determining the destination of the packet which is connected to the second physical switch, logic adapted for determining whether a security policy is to be applied to the packet based on at least one of: contents of the packet, the first information, and the second information, logic adapted for selecting a communication path between the first physical switch and the second physical switch, wherein the selected communication path directly connects the first physical switch to the second physical switch when it is determined to not apply the security policy to the packet, and wherein the selected communication path connects the first physical switch to the second physical switch via the security appliance when it is determined to apply the security policy to the packet, and logic adapted for sending the selected communication path to the first physical switch.

Furthermore, in various approaches, the virtual network controller may further comprise logic adapted for instructing the switch controller to program overlay network nodes such that any packets transferred between the source VM and the destination of the packet proceed along the selected communication path; the first information may comprise at least an address of the source VM; the second information may comprise at least an address of the second physical switch; and/or the logic adapted for determining whether the security policy is to be applied to the packet may comprise: logic adapted for determining that the source VM and the destination VM are in a common group or domain and determining to not apply the security policy and logic adapted for determining that the source VM and the destination VM are not in a common group or domain and determining to apply the security policy.

In even more various approaches, the first and second physical switches may be capable of providing overlay functionality to packets received and sent by each switch; the logic adapted for determining whether the security policy is to be applied to the packet may comprise logic adapted for applying ACLs to the packet to determine whether the security policy is to be applied to the packet; and/or the security policy may direct application of one or more services by the security appliance. Any services or security policies may be used, such as: firewall services, IPS, IDS, server load balancing services, VPN services, video optimization services, and/or WAN optimization services, etc.

In another exemplary embodiment, a computer program product for applying security policy in an overlay network may comprise a computer readable storage medium having computer readable program code embodied therewith. The computer readable program code may comprise computer readable program code configured for receiving a request for a communication path through an overlay network, the request being sent from a first physical switch in the overlay network, wherein the first physical switch is connected to a source of the packet, and wherein the request comprises at least a packet, first information, and second information, computer readable program code configured for determining a second physical switch which is connected to a destination of the packet, computer readable program code configured for determining whether a security policy is to be applied to the packet based on at least one of: contents of the packet, the first information, and the second information, computer readable program code configured for selecting a communication path between the first physical switch and the second physical switch, wherein the selected communication path directly connects the first physical switch to the second physical switch when it is determined to not apply the security policy to the packet, and wherein the selected communication path connects the first physical switch to the second physical switch via the security appliance when it is determined to apply the security policy to the packet, and computer readable program code configured for sending the selected communication path to the first physical switch.

According to various embodiments, the computer program product may further comprise computer readable program code configured for instructing a switch controller to program overlay network nodes such that any packets transferred between the source of the packet and the destination of the packet proceed along the selected communication path; the first information may comprise at least an address of a source VM which originated the packet, and wherein the source of the packet is the source VM; and/or the second information may comprise at least an address of the second physical switch.

In another embodiment, the first physical switch may be connected to at least a first server hosting at least a source VM which originated the packet which is the source of the packet, the second physical switch may be connected to at least a second server hosting at least a destination VM which is the destination of the packet, and the computer readable program code configured for determining whether the security policy is to be applied to the packet may comprise: computer readable program code configured for determining that the source VM and the destination VM are in a common group or domain and determining to not apply the security policy and computer readable program code configured for determining that the source VM and the destination VM are not in a common group or domain and determining to apply the security policy.

In more approaches, the first and second physical switches may be capable of providing overlay functionality to packets received and sent by each switch and/or the computer readable program code configured for determining whether the security policy is to be applied to the packet may comprise computer readable program code configured for applying ACLs to the packet to determine whether the security policy is to be applied to the packet.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:
1. An apparatus, comprising:
a hardware processor;
a memory; and
logic stored to the memory or integrated with the processor, the logic being configured to cause the processor to:
communicate with a first physical switch, a second physical switch, and an overlay network that connects the first physical switch to the second physical switch;
receive a request for a communication path through the overlay network for a particular packet, the request comprising at least:
the packet;
first information about a source of the packet, the source of the packet being connected to the first physical switch; and
second information about a most closely connected physical switch to a destination of the packet;
determine the destination of the packet, the destination of the packet being connected to the second physical switch; and determine whether to apply a security policy to the packet, wherein the logic configured to determine whether to apply the security policy to the packet is configured to:
inspect an overlay header of each packet to determine whether markers in the overlay header of each packet indicate that the each packet should receive security policy application; and
inspect an inner payload header of each packet to determine whether the inner payload header of each packet indicates that the each packet should receive security policy application.

2. The apparatus as recited in claim 1, wherein the logic is configured to select a communication path between the first physical switch and the second physical switch for the packet, and wherein OpenFlow is utilized to manage the overlay network that connects the first physical switch to the second physical switch.

3. The apparatus as recited in claim 2, wherein the selected communication path directly connects the first physical switch to the second physical switch in response to a determination to not apply the security policy to the packet, and wherein the selected communication path connects the first physical switch to the second physical switch via a security appliance in response to a determination to apply the security policy to the packet.

4. The apparatus as recited in claim 3, wherein the security policy directs application of one or more services by the security appliance in response to the determination to apply the security policy to the packet, the services being selected from the group consisting of:
firewall services;
intrusion prevention services (IPS);
intrusion detection services (IDS);
server load balancing services;
virtual private network (VPN) services;
video optimization services; and
wide area network (WAN) optimization services.

5. The apparatus as recited in claim 2, wherein the logic is configured to send at least a portion of the selected communication path to the first physical switch.

6. The apparatus as recited in claim 2, wherein the logic is configured to instruct a switch controller to program overlay network nodes in the overlay network to transfer the particular packets between their source and their destination along the selected communication path.

7. The apparatus as recited in claim 2, wherein the logic is configured to instruct a switch controller to inform a second server about the source of the packet being present on a first server in response to receiving the request for the communication path through the overlay network, the second server hosting the destination of the packet.

8. The apparatus as recited in claim 1, wherein the logic configured to determine the destination of the packet is configured to determine the destination of the packet based on information selected from a group consisting of: contents of the packet, the first information, and the second information.

9. The apparatus as recited in claim 1, wherein the first information comprises an address of the source of the packet, and wherein the second information comprises an address of the second physical switch.

10. The apparatus as recited in claim 1, wherein the logic configured to determine whether to apply the security policy to the packet is configured to:
determine to not apply the security policy in response to a determination that the source of the packet and the destination of the packet are in a common group or domain; and
determine to apply the security policy in response to a determination that the source of the packet and the destination of the packet are not in a common group or domain.

11. The apparatus as recited in claim 1, wherein the logic configured to determine whether to apply the security policy to the packet is configured to apply one or more Access Control Lists (ACLs) to the packet to determine whether the security policy is to be applied to the packet.

12. A computer program product comprising a computer readable storage medium having program instructions embodied therewith, wherein the computer readable storage medium is not a transitory signal per se, the embodied program instructions readable/executable by a processor to cause the processor to:
communicate, by the processor, with a first physical switch, a second physical switch, and an overlay network that connects the first physical switch to the second physical switch;
receive, by the processor, a request for a communication path through the overlay network for a particular packet, the request comprising at least:
the packet;
first information about a source of the packet, the source of the packet being connected to the first physical switch; and
second information about a most closely connected physical switch to a destination of the packet;
determine, by the processor, the destination of the packet, the destination of the packet being connected to the second physical switch; and
determine, by the processor, whether to apply a security policy to the packet by causing the processor to:
inspect, by the processor, an overlay header of each packet to determine whether markers in the overlay header of each packet indicate that the each packet should receive security policy application; and
inspect, by the processor, an inner payload header of each packet to determine whether the inner payload header of each packet indicates that the each packet should receive security policy application.

13. The computer program product as recited in claim 12, wherein the embodied program instructions are readable/executable by the processor to cause the processor to select a communication path, by the processor, between the first physical switch and the second physical switch for the packet, and wherein OpenFlow is utilized to manage the overlay network that connects the first physical switch to the second physical switch.

14. The computer program product as recited in claim 13, wherein the selected communication path directly connects the first physical switch to the second physical switch in response to a determination to not apply the security policy to the packet, and wherein the selected communication path connects the first physical switch to the second physical switch via a security appliance in response to a determination to apply the security policy to the packet.

15. The computer program product as recited in claim 14, wherein the security policy directs application of one or more services by the security appliance, the services being selected from the group consisting of:
firewall services;
intrusion prevention services (IPS);

intrusion detection services (IDS);
server load balancing services;
virtual private network (VPN) services;
video optimization services; and
wide area network (WAN) optimization services.

16. The computer program product as recited in claim 13, wherein the embodied program instructions are readable/executable by the processor to cause the processor to send, by the processor, at least a portion of the selected communication path to the first physical switch.

17. The computer program product as recited in claim 13, wherein the embodied program instructions are readable/executable by the processor to cause the processor to instruct, by the processor, a switch controller to program overlay network nodes in the overlay network to transfer packets between their source and their destination along the selected communication path.

18. The computer program product as recited in claim 13, wherein the embodied program instructions are readable/executable by the processor to cause the processor to instruct, by the processor, a switch controller to inform a second server about the source of the packet being present on a first server in response to receiving the request for the communication path through the overlay network, the second server hosting the destination of the packet.

19. The computer program product as recited in claim 12, wherein the embodied program instructions readable/executable by the processor to cause the processor to determine, by the processor, the destination of the packet are further readable/executable by the processor to cause the processor to determine, by the processor, the destination of the packet based on information selected from a group consisting of: contents of the packet, the first information, and the second information.

20. The computer program product as recited in claim 12, wherein the first information comprises an address of the source of the packet, and wherein the second information comprises an address of the second physical switch.

21. The computer program product as recited in claim 12, wherein the embodied program instructions readable/executable by the processor to cause the processor to determine whether to apply the security policy to the packet are readable/executable by the processor to cause the processor to:
  determine, by the processor, to not apply the security policy in response to a determination that the source of the packet and the destination of the packet are in a common group or domain; and
  determine, by the processor, to apply the security policy in response to a determination that the source of the packet and the destination of the packet are not in a common group or domain.

22. The computer program product as recited in claim 12, wherein the embodied program instructions readable/executable by the processor to cause the processor to determine whether to apply the security policy to the packet are readable/executable by the processor to cause the processor to apply, by the processor, one or more Access Control Lists (ACLs) to the packet to determine whether the security policy is to be applied to the packet.

* * * * *